3,210,179
MICROBIOLOGICAL NITROGEN FIXATION
John B. Davis and Javon P. Stanley, Dallas, Tex., assignors to Socony Mobil Oil Company, Inc., a corporation of New York
Filed Jan. 11, 1962, Ser. No. 165,510
9 Claims. (Cl. 71—7)

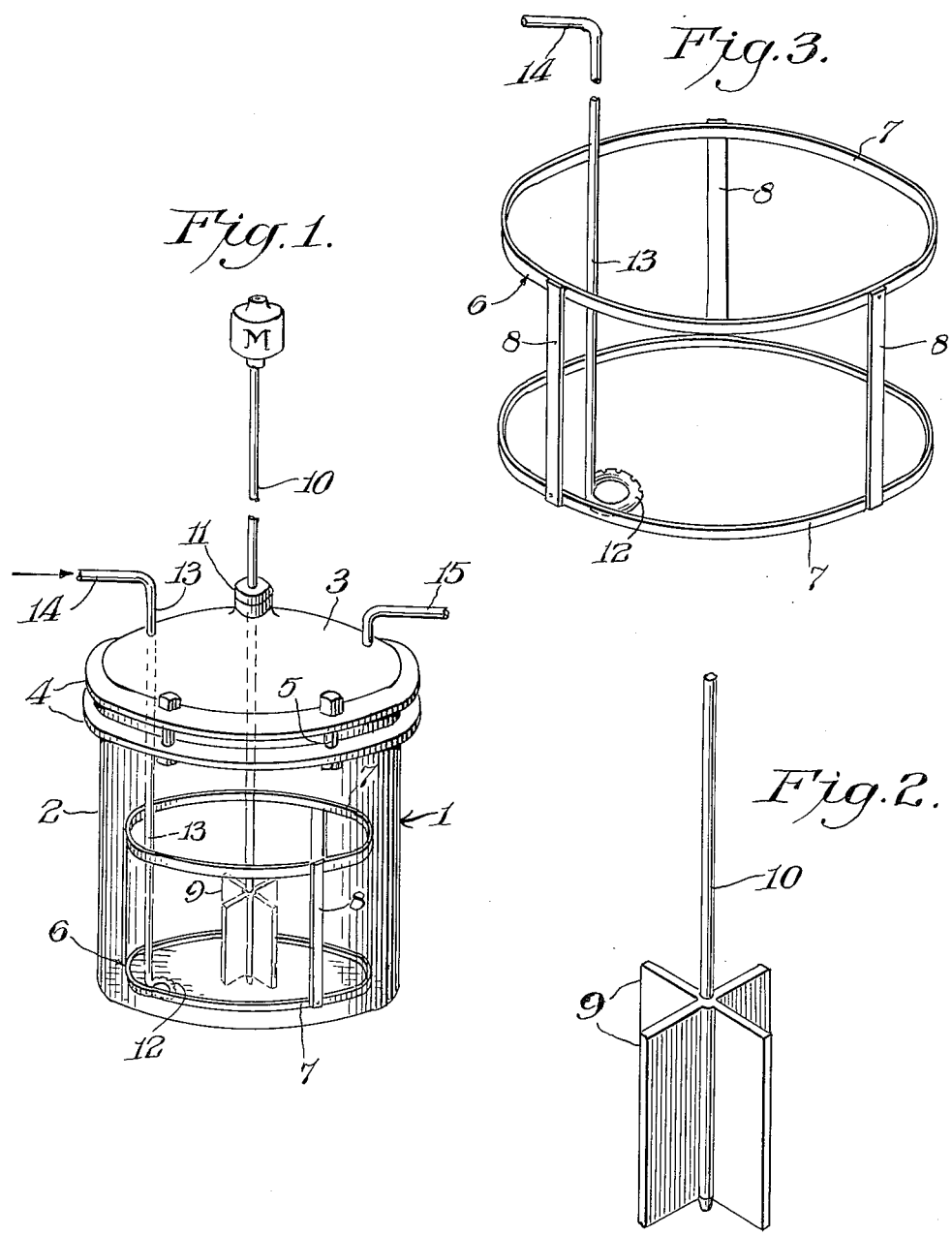

This invention relates to nitrogen fixation. More particularly, it relates to the conversion of nitrogen into fertilizers by the action of certain microbes on hydrocarbons in the presence of elemental nitrogen.

The fixation of atmospheric or gaseous nitrogen by certain microorganisms is known. For example, aerobic bacteria of the genus Azotobacter, certain anaerobic bacteria, particularly the *Clostridium pasteurianum*, the Rhizobia in the root nodules of the legumes and certain blue-green algae have been demonstrated to convert nitrogen into microbial protein nitrogen. While it has been observed in a few reported instances that soil around an oil pipe or a natural gas line containing a leak, or in other words, soil having more hydrocarbons in it than normal, are richer in nitrogen content than contiguous, normal soils hithertofore there has not been known any microorganism that oxidizes hydrocarbons and fixes nitrogen. That soils inadvertently or puropsely containing hydrocarbons or pretroleum residues are richer in nitrogen or afford better crop yields has been thought to be due to the action of Clostridia or to Azotobacter or the utilization of the hydrocarbon as a food along with inorganic and organic nitrogen compounds in the soil by bacteria in the soil, the increased bacteria content of the soil representing an increase in the organic matter in the soil, inorganic nitrogen compounds already in the soil being converted to organic forms. Suffice it to say, hithertofore the cultivation of hydrocarbon oxidizing microbes in the presence of gaseous, elemental nitrogen but in the absence of other nitrogen compounds has not been known. Since hydrocarbons are inexpensive compounds, the fixation of elemental nitrogen coupled with the utilization of such materials, particularly of hydrocarbons normally constituting waste products, is a most desirable purpose.

Accordingly, an objective of this invention is the affording of microorganisms capable of feeding on hyrocarbons and fixing elemental nitrogen. Another purpose is the production of nitrogen-rich fertilizers. A still further object is the provision of such fertilizers in which the nitrogen is in an organic form. Another objective is the provision of fertilization procedures in which the nitrogen is made available in situ using hydrocarbons as a food source. These and other purposes appear hereinafter.

The objectives of this invention are accomplished by the action of *Pseudomonas methanitrifican*, n. sp. *Pseudomonas nitrimethanica* or *Pseudomonas nitrimethanica* var. *citreus*, among others, on hydrocarbons in the presence of elemental nitrogen. The nitrogen may be added as air or it may be added separately or admixed with oxygen. In one form of the invention the microorganism is grown in an oxidator containing an aqueous salt media, but devoid of nitrogen, and the hydrocarbon, the nitrogen and oxygen are fed to the microorganism. Abundant growth of the organisms results with the production of nitrogen compounds. These compounds appear mainly as part of the microbial protein, and thus, the nitrogen is in the form of organic material. In another embodiment of this invention soil desired to be fertilized is inoculated, for example, with *Pseudomonas methanitrificans*, n. sp. and either simultaneous with or prior to or following the inoculation the soil is treated with a hydrocarbon. The growth of the nitrogen-fixing bacteria is thus promoted with a resultant increase in available nitrogen. Better crop yields are thus obtained.

The U.S. Agricultural Research Service Laboratory has designated the organisms as follows: *Pseudomonas methanitrificans*, n. sp.: NRRL B–2815; *Pseudomonas nitrimethanica*: NRRL B–2818; and *Pseudomonas nitrimethanica* var. *citreus*: NRRL B–2819.

From the above it can readily be appreciated that the processes involved are chemical processes or manners of new manufacture requiring an operator who maintains appropriate conditions and drives the microorganisms to the desired results. The operator separates the resultant mixtures or the desired products for further utilization as desired.

This invention will be further understood by reference to the figures and to the examples below which are given for illustrative purposes only and are not to be taken as limitative, the figures being as follows:

FIGURE 1 is a perspective of apparatus used in a fermentation process, and

FIGURES 2 and 3 show certain parts of the agitation system therein.

As can be seen from FIGURE 1, the oxidator 1 comprises a vessel 2 having a lid 3, the two being held together by flanges 4 through bolting members 5. Positioned inside the vessel 2 is a stainless steel fritted sparger 6 which comprises two circular rings 7 connected by uprights 8 which co-act with the impeller 9 to impart violent agitation and a shearing action to the contents. The impeller is motor driven at M through shaft 10 positioned to rotate in a graphite impregnated bronze bearing mounted in a neoprene plug at 11 in the top 3. At the bottom of the sparger is a perforated disk 12 which has tube 13 leading to the perforations in sealed arrangement to deliver materials through the perforations and into the charge, the inlet being at 14. Pressure within the vessel may be kept at atmospheric pressure, the feeding of gaseous materials being commensurate with their utilization by the microbes. If desired, excess materials may be passed through outlet 15 to be recirculated, sent to another oxidator or collected, using conventional pumping means when needed. Thus, the processes of this invention encompass running a plurality of oxidators in a bank or a continuous operation. Since the processes of this invention involve aerobic conditions, normally oxygen or air will be supplied along with the food materials. Therefore, an outlet 15 is usually provided and in many instances this can be simply an opening plugged with cotton or other porous material.

*Example I*

In preliminary work soil samples were tested for the presence of microorganisms capable of oxidizing hydrocarbons and fixing atmospheric nitrogen by placing 0.1 gram samples together with 25 ml. of a mineral salts medium in a sealed bottle and under air containing 30% methane. The aqueous medium had the following composition.

| Component: | Gram/liter of water |
|---|---|
| $Na_2HPO_4$ | 0.3 |
| $KH_2PO_4$ | 0.2 |
| $MgSO_4 \cdot 7H_2O$ | 0.1 |
| $FeSO_4 \cdot 7H_2O$ | 0.005 |
| $NaMoO_4 \cdot 2H_2O$ | 0.002 |

Incubation was at 30° C. and lasted several weeks. Of many samples so tested, only one sample showed growth of cultures therein. These bacteria were gram negative, non-spore forming, low-motile rods. These bacteria were isolated and further culturing confirmed that the microorganisms, originally or stemming from those in the original isolation, grew on methane in media devoid of added nitrogen compounds. As the cultures grew, the amount of nitrogen in a fixed form increased also.

The microbes were named *Pseudomonas methanitrificans,* n. sp. The microbe is quite small, 2 x 1 microns, exhibits some motility, and has granules in the cells. It forms white colonies on mineral salts agar medium. It will not grow on common nutrient agar medium. The culture grows well on agar plates or slants and liquid media under methane and air but to which no nitrogen compounds have been added.

Of the *Pseudomonas methanitrificans,* n. sp., there are several different strains; all are low-motile, and all are gram-negative, but they vary a bit in size and pigmentation. In one experiment a culture grew well on ethane fixing nitrogen while so growing in media devoid of fixed nitrogen sources. It appeared to grow as well on ethane as did the culture described above.

As it is known that molybdate salts are generally required for growth of nitrogen-fixing microorganisms, similar culturing was tried in the absence of such salts. No growth was obtained without the molybdate salts. However, it is not necessary to grow the cultures on purified or synthetic culture media for soil extracts may be added to supply trace elements. Whether all of these contain molybdates is not known, but if one is to use synthetic media as opposed to naturally occurring media, he should add molybdate to such media.

*Example II*

To each of three bottles each of which contained 10 ml. of the aqueous salt solution described above was added a small inoculum of *Pseudomonas methanitrificans,* n. sp., each inoculum being approximately of the same size and weight. Each container was evacuated and then filled with air containing 30% methane. One bottle was kept at 5° C. to prevent growth while the other two were incubated at 30° C. Within five days growth resulted in these two while the control remained clear, not becoming turbid as did the others and being without growth. At the end of two weeks all three samples were analyzed (Kjeldahl) first acidifying the contents with a nitrogen-free acid to trap any basic nitrogen compounds such as ammonia. The sample kept in the cold and without growth contained only 0.03 mg. of nitrogen whereas the other two samples analyzed contained 0.86 and 0.66 mg. of nitrogen.

In further experiments a variety of media such as agar plates, agar slants as well as liquid media, to which no nitrogen compounds were added were inoculated with recognized microorganisms known to utilize methane. No growth of these resulted. For example, under control conditions *Pseudomonas (Methanomonas) methanica,* which grows well on methane in the presence of added nitrogen compounds, failed to grow on the substrates containing no added nitrogen compounds even though methane and elemental nitrogen were present. The same was true for Nocardia species known to utilize many hydrocarbons. Yet, the microorganisms of this invention did grow well on said media fixing the nitrogen as they grew.

*Example III*

Using equipment similar to that shown in the figures, fermentation systems were prepared using 25 mg. of cells (dry weight) and 2 liters of the aqueous substrate described above. Gases comprising methane and oxygen and nitrogen were fed to the media while it was stirred vigorously. Other than the elemental nitrogen and the minute nitrogen content of the inoculum the system was nitrogen-free. The gases coming from the oxidator were recycled or passed to an adjoining oxidator or discarded. The systems were kept at room temperature, being about 25° C.–30° C.

Flow rate for the gas was maintained at 0.5 liter per minute and the oxidators were run for 200 hours with the impeller running at about 150 r.p.m. Very good results are obtained using only the mild agitation effected by the gas flow. In every instance the oxidators quickly became turbid and good growth resulted with yields of cells varying from 0.75 gram to 1.0 gram per liter. The fixed nitrogen varied from 53 mg. to 70 mg. per liter.

In the absence of elemental nitrogen, very little growth resulted.

In similar experiments ethane is used instead of methane with equally as good results.

*Example IV*

The experiment described above in Example III was repeated but *Pseudomonas nitrimethanica* was used as the hydrocarbon oxidizer/nitrogen fixer. Methane was used in the hydrocarbon. It was readily used as a food by the organism and nitrogen was taken out of the air stream and converted into chemicals such as proteins within the cells.

This organism, a gram negative rod, is about 4 x 1.5 microns in size and is non-motile. It produces smooth, moist creamy white colonies on agar media. It grows on conventional agar media.

Similar results are attained using n-hexane, ethyl benezene or n-butane.

*Example V*

In repeating the experiment of Example III again, *Pseudomonas nitrimethanica* var. *citreus* is used with methane. Here again, excellent growth is obtained in the absence of nitrogen compounds but in the presence of nitrogen gas, air being its source.

This organism, a gram negative rod, is about 4 x 1 microns in size, has faint granules as seen by phase contrast microscopy, and is non-motile. It produces yellow, soft, rugose colonies on agar media. It grows on conventional agar media being soft.

When heptane or propane is used, nitrogen is also fixed.

*Example VI*

A small section of land is cultivated in the usual manner for the preparation of a seed bed, and a nitrogen fixer of this invention is worked into the soil to inoculate the soil. Kerosene is next added stepwise by several sprayings. The contiguous sections are not so treated but to all these areas is added grass seed in equal quantities. After germination, growth and maintenance of the plots, the grass grown in the treated section is found to be thicker, to have less weeds and to be of a much darker and more pleasant green than the grass in the adjoining strips.

In a similar experiment perforated plastic pipes are laid a few inches below the soil or on top of the soil with perforations next to the ground, and methane is forced through the perforations and is thus added to or made to contact the soil. Organic fertilizer is produced with resultant increases in crop yields. In another experiment air is fed along with ethane and further fixation results. Good results may be obtained using only a few pounds of the microbes per acre and similar amounts of the hydrocarbon.

Example VII

While normally the atmospheric pressure upon the ground is adequate for contact of the microorganisms of this invention with atmospheric nitrogen, further improvement in nitrogen-fixation is effected by repeated treatments coupled with seed bed preparation. For example, following the procedure of Example VI one section is prepared and treated once and is kept as the control while adjacent sections are cultivated occasionally, some with and some without the addition of further hydrocarbon and microorganism. In each of these instances and especially in those sections containing added hydrocarbon and organisms, much better crop yields are obtained indicating that increased exposure of the microorganisms to the atmosphere or increased contact of it with the elemental nitrogen favors more fixation.

It will be appreciated that a large variety of mineral salts may be used in growing the organisms of this invention and in fixing nitrogen thereby. These media include many carbonates, chlorides, sulfates, phosphates, molybdates, their acid salts, the cations being potassium, sodium, manganese, iron and the like. A large variety of soil extracts can be used also for almost invariably such extracts contain the trace elements needed for microbial growth. These media are generally agitated usually at low or normal speeds, although vigorous agitation can be used if desired. While pressure may be applied in the fermentor, usually atmospheric pressure is used. The temperatures in the fermentor processes are normal, about 75° F. to about 115° F. Those in the soil are those prevailing at the time of application being usually spring, summer and fall temperatures in this zone.

In either of the processes, soil or fermentor, it is preferred to keep the pH neutral. Thus, while the pH may be about 6.0 to about 8.0, it is preferred to keep it at 7.0. The phosphates, such as potassium dihydrogen phosphate, are used as buffers to do this. The fermentors can be run on a continuous basis, the cells being removed while leaving some as an inoculate and while adding fresh medium.

When gases are being used as the substrates, the concentration of the hydrocarbon is not critical. Generally, it is 15% to 50% of the hydrocarbon/air mixture. While oxygen is required for the oxidation no special means for supplying it are needed. Thus, the fermentor may simply get its oxygen and the nitrogen to be fixed merely from the surrounding air by normal exposure of the mass to the air. Usually, it is preferred to feed air along with the hydrocarbon since this leads to greater growth by increased contact of the cells with the food.

When liquid hydrocarbons are being fed, it is preferred to use lower concentrations and this is also true for the solids. The concentrations are about 0.1% to about 1.0% based upon the weight of the medium. While concentrations may be increased by using stepwise additions and vigorous agitation, the organisms grow very well in the absence of such steps, and accordingly, normal conditions are usually used.

Of the various hydrocarbons that can be used it is preferred to use the gaseous ones since they are in general the cheapest. Here again they can be added to soil without too much concern about concentration. In general, the hydrocarbons are added in amounts about 0.01% to about 0.1% by weight of the soil, but the exact amount will vary depending upon soil, weather and similar conditions. Many soils are very low in nitrogen content, and a process of this invention is directed to increasing soil nitrogen. Thus, one will seek to create a growth situation by adding a relatively large amount of methane, ethane or higher hydrocarbons to the soil or by adding a relatively large amount of microbial inoculum or by adding both. In this connection it is to be appreciated that cellular matter added to the soil may contain dead or live cells or mixtures thereof and the soil additive may include the culture solution or what remains of it upon evaporation of the water from the media usually contain nitrogenous matter derived from autolyzed cells or possible extra cellular products in addition to salts purposely present. The fixed nitrogen in the solution usually represents about 10% of the total amount fixed.

By the process of this invention fixation of atmospheric nitrogen is effected with the production of an organic fertilizer. Conversions of inexpensive hydrocarbons, such as methane, can be effected in amounts upward of 50%. Based on cost estimates 100 lbs. of organic fertilizer containing 40% to 50% protein or about 6.5% to about 8.0% nitrogen can be produced, either in a plant or in situ, as a cost of $0.72. One needs only to compare this to $2.00–$2.25, the cost of 100 lbs. of animal manure which contains only about 2% nitrogen to realize the tremendous advance in agricultural technology afforded by this invention.

While the invention has been disclosed herein in connection with certain embodiments and certain procedural details, it is clear that changes, modifications or equivalents can be used by those skilled in the art; accordingly, such changes within the principles of this invention are intended to be included within the scope of the claims below.

We claim:

1. A method for increasing nitrogen in soil which comprises inoculating the soil by introducing into it at least one microorganism selected from the group consisting of *Pseudomonas methanitrificans*, n. sp., *Pseudomonas nitrimethanica* and *Pseudomonas nitrimethanica* var. *citreus;* introducing a hydrocarbon into the soil; and exposing the resultant mixture to air, the said microorganisms being numbered by the U.S. Agricultural Research Service Laboratory as follows: NRRL B–2815, NRRL B–2818, and NRRL B–2819, respectively.

2. A method in accordance with claim 1 in which the said microorganism is *Pseudomonas methanitrificans*, n. sp.

3. A method in accordance with claim 1 in which the said microorganisms is *Pseudomonas nitrimethanica*.

4. A method in accordance with claim 1 in which the said microorganism is *Pseudomonas nitrimethanica* var. *citreus*.

5. A method in accordance with claim 1 in which the said hydrocarbon is added in amounts of about 0.01% to about 0.1% by weight of the soil.

6. A method for increasing nitrogen in soil which comprises inoculating the soil by introducing into it at least one microorganism selected from the group consisting of *Pseudomonas methanitrificans*, n. sp., *Pseudomonas nitrimethanica* and *Pseudomonas nitrimethanica* var. *citreus;* introducing a hydrocarbon into the soil; and exposing the resultant mixture to elemental oxygen and elemental nitrogen, the said microorganisms being numbered by the U.S. Agricultural Research Service Laboratory as follows: NRRL B–2815, NRRL B–2818, and NRRL B–2819, respectively.

7. A process in accordance with claim 6 in which the hydrocarbon is gaseous.

8. A method for increasing nitrogen in an aqueous medium contained in a vessel and containing inorganic salts that are nutrients for microorganism which method comprises inoculating said medium by introducing into it at least one microorganism selected from the group consisting of *Pseudomonas methanitrificans*, n. sp., *Pseudomonas nitrimethanica* and *Pseudomonas nitrimethanica* var. *citreus;* introducing a hydrocarbon into the resultant mixture; and exposing the resultant mixture to air, the said microorganisms being numbered by the U.S. Agricultural Research Service Laboratory as follows: NRRL B–2815, NRRL B–2818, and NRRL B–2819, respectively.

9. A method in accordance with claim 8 in which the hydrocarbon is added in amounts of about 0.1% to about 1.0% based upon the weight of said aqueous medium.

(References on following page)

References Cited by the Examiner

UNITED STATES PATENTS

| | | | |
|---|---|---|---|
| 982,569 | 1/11 | Bottomley | 71—7 |
| 1,252,332 | 1/18 | Earp-Thomas | 71—7 |
| 1,938,647 | 12/33 | Earp-Thomas | 71—7 |
| 2,200,532 | 5/40 | Bond | 71—7 |
| 2,697,061 | 12/54 | Harris et al. | 195—1 |
| 2,697,062 | 12/54 | Cramer | 195—1 |
| 2,756,134 | 7/56 | Novak | 71—9 |
| 2,767,072 | 10/56 | Coanda | 71—7 |
| 3,105,014 | 9/63 | Harrison | 195—3 |
| 3,115,404 | 12/63 | Carney | 71—7 |

OTHER REFERENCES

Textbook of General Botany, Holman and Robbins, Second Edition, 1928, pages 400–406, John Wiley and Sons.

DONALL H. SYLVESTER, *Primary Examiner.*

ANTHONY SCIAMANNA, *Examiner.*